US011137020B2

(12) United States Patent
Yamaguchi et al.

(10) Patent No.: US 11,137,020 B2
(45) Date of Patent: Oct. 5, 2021

(54) SLIDE BEARING

(71) Applicant: TAIHO KOGYO CO., LTD., Toyota (JP)

(72) Inventors: Sosuke Yamaguchi, Toyota (JP);
Shinichi Kato, Toyota (JP)

(73) Assignee: TAIHO KOGYO CO., LTD.

( * ) Notice: Subject to any disclaimer, the term of this patent is extended or adjusted under 35 U.S.C. 154(b) by 0 days.

(21) Appl. No.: 16/482,504

(22) PCT Filed: Jan. 26, 2018

(86) PCT No.: PCT/JP2018/002508
§ 371 (c)(1),
(2) Date: Jul. 31, 2019

(87) PCT Pub. No.: WO2018/143091
PCT Pub. Date: Aug. 9, 2018

(65) Prior Publication Data
US 2020/0011371 A1 Jan. 9, 2020

(30) Foreign Application Priority Data

Feb. 2, 2017 (JP) .............................. JP2017-017385

(51) Int. Cl.
*F16C 17/02* (2006.01)
*F16C 33/10* (2006.01)
*F16C 33/04* (2006.01)

(52) U.S. Cl.
CPC ............ *F16C 17/02* (2013.01); *F16C 33/046* (2013.01); *F16C 33/1065* (2013.01)

(58) Field of Classification Search
CPC ........ F16C 17/02; F16C 29/02; F16C 29/025; F16C 33/1065; F16C 33/20; F16C 33/046
See application file for complete search history.

(56) References Cited

U.S. PATENT DOCUMENTS

| 1,298,100 A * | 3/1919 | Royce ...................... F16C 33/04 |
| | | 384/276 |
| 2,283,918 A * | 5/1942 | Dekome ................ B21D 53/10 |
| | | 29/898.056 |

(Continued)

FOREIGN PATENT DOCUMENTS

| JP | S57-141228 U | 9/1982 |
| JP | H11-210753 A | 8/1999 |

(Continued)

OTHER PUBLICATIONS

Japanese Office Action for Patent Application No. JP 2017-017385, dated May 12, 2020 (9 pages).

(Continued)

*Primary Examiner* — James Pilkington
(74) *Attorney, Agent, or Firm* — Harness, Dickey & Pierce, P.L.C.

(57) ABSTRACT

A slide bearing in the present invention is formed in a cylindrical shape and has an inner peripheral surface sliding along an axis, the slide bearing includes: a first groove in which the extension direction is a direction having a component in a circumferential direction on the inner peripheral surface; and at least two second grooves that are branched from the first groove and in which the extension directions are directions each having a component in an axial direction at least within a predetermined range from the first groove. Within a predetermined range from an end opposite to the first groove of the second groove, the width or the depth gradually decreases toward the end.

3 Claims, 7 Drawing Sheets

(56) References Cited

U.S. PATENT DOCUMENTS

| | | | | |
|---|---|---|---|---|
| 4,105,267 | A | * | 8/1978 | Mori ................. F16C 33/1065 384/291 |
| 6,491,438 | B1 | * | 12/2002 | Ono ........................ F16C 9/02 384/288 |
| 8,821,023 | B2 | * | 9/2014 | Bresser ................ F16C 33/105 384/292 |
| 2009/0223083 | A1 | * | 9/2009 | LeCrone ................ F16C 17/02 34/524 |
| 2010/0054640 | A1 | | 3/2010 | Yen et al. |
| 2012/0294558 | A1 | | 11/2012 | Ovares et al. |
| 2018/0187765 | A1 | * | 7/2018 | Narayan ................ F16C 43/02 |

FOREIGN PATENT DOCUMENTS

| | | | |
|---|---|---|---|
| JP | 2010-084778 | A | 4/2010 |
| JP | 2011-214672 | A | 10/2011 |
| JP | 2012-515303 | A | 7/2012 |
| JP | 2014-513784 | A | 6/2014 |
| JP | 2016-180463 | A | 10/2016 |

OTHER PUBLICATIONS

2nd Chinese Office Action for corresponding Application No. 201880009424.0 dated Nov. 11, 2020 (14 pages) with English translation.

Japanese Office Action for Patent Application No. JP 2017-017385, dated Jan. 5, 2021 (4 pages).

Office Action issued for the corresponding German Application No. DE11201800065; dated Jul. 26, 2021 (7 pages).

* cited by examiner

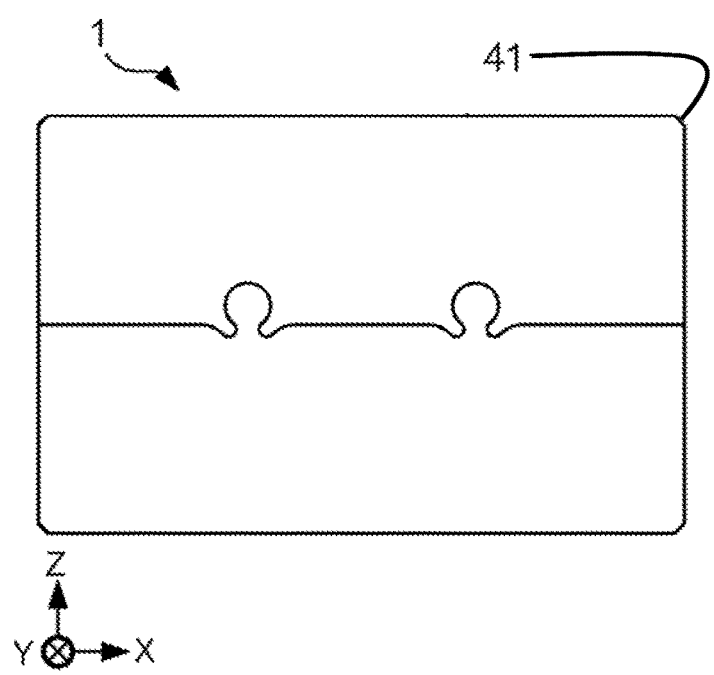
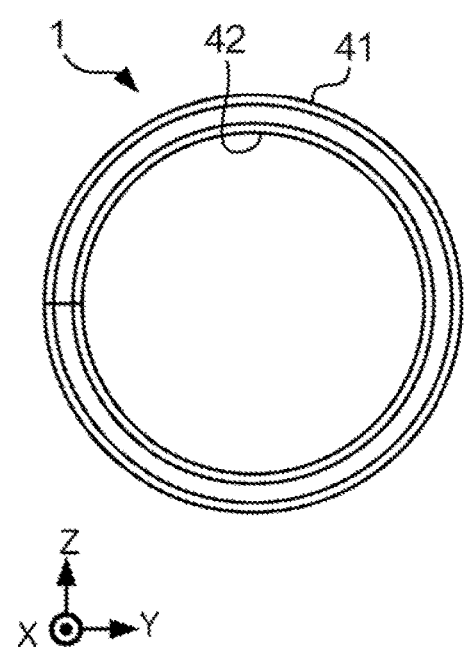
FIG. 1A
FIG. 1B

SLIDE BEARING

CROSS-REFERENCE TO RELATED APPLICATIONS

This application is a U.S. National Stage Application of International Application No. PCT/JP2018/002508, filed on Jan. 26, 2018, which claims priority to Japanese Application No. 2017-017385, filed on Feb. 2, 2017. The entire disclosures of the above applications are incorporated herein by reference.

BACKGROUND

Technical Field

The present invention relates to a slide bearing.

Related Art

As a slide bearing having a groove on an inner peripheral surface, there is a journal bearing disclosed in JP 2012-515303A, for example. The groove provided in this journal bearing has a constant width and a predetermined width at the end thereof.

The slide bearing having a groove on the inner peripheral surface is manufactured, for example, by forming a groove in a plate material through press molding, and processing the plate material having the groove into a cylindrical shape. At this time, when the groove is pressed, if the amount of displacement of the plate material at the end of the groove is large, cracking occurs in the plate material. In the journal bearing disclosed in JP 2012-515303A, the displacement amount of the plate material at the end is large, and cracking occurs on the inner peripheral surface.

An object of the present invention is to suppress the occurrence of cracking in a slide bearing.

SUMMARY

The present invention provides, in one aspect, a slide bearing formed in a cylindrical shape and having an inner peripheral surface sliding along an axis, the slide bearing includes: a first groove extending in a direction having a component in a circumferential direction, on the inner peripheral surface; and at least two second grooves branched from the first groove, extending in directions each having a component in a axial direction at least within a predetermined range from the first groove, wherein, within a predetermined range from an end opposite to the first groove, of the second groove, a width or a depth gradually decreases toward the end.

In a preferred embodiment, of the second grooves, in the second groove closest to one end face in the axial direction and the second groove closest to the other end face in the axial direction, within the predetermined range from the end, an angle between an extension direction of a first wall close to the end face and the axial direction may be larger than an angle between an extension direction of the second wall far from the end face and the axial direction.

In another preferred embodiment, within the predetermined range from the end of the second groove, an imaginary line drawn from the end in the circumferential direction may enter the region of the second groove.

Advantageous Effects of Invention

According to the present invention, the occurrence of cracking in the slide bearing can be suppressed.

BRIEF DESCRIPTION OF THE DRAWINGS

FIG. 1A is an elevation view and FIG. 1B is a side view of bushing 1 according to one embodiment of the present invention.

DETAILED DESCRIPTION

Figure 2:
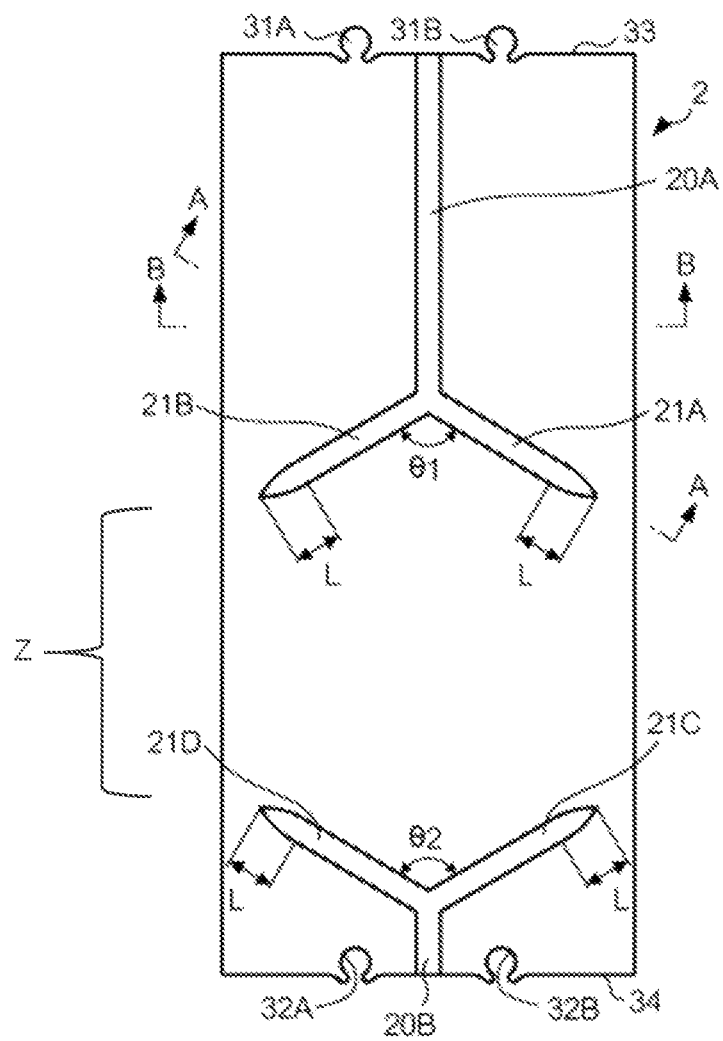
FIG. 2 is a plan view of plate material 2.

FIG. 1A is an elevation view of bushing 1 according to one embodiment of the present invention, and FIG. 1B is a side view of bushing 1. In the drawings, directions are indicated by an orthogonal X-axis, Y-axis, and Z-axis, where the left-right direction is the X-axis direction, the front-rear direction (width direction) is the Y-axis direction, and the vertical direction is the Z-axis direction. In the drawings, those in which "x" is written in "○" means an arrow directed from the front to the back of the drawing, and those in which "●" is written in "○" means an arrow directed from the back to the front of the drawing. In the drawings, actual dimensions are made different so that shapes and positional relationships can be easily understood.

Bushing 1 according to the present embodiment is a clinch joint bushing. Bushing 1 is a slide bearing that is disposed at a small end portion of a connecting rod in an internal combustion engine and supports a piston pin. Bushing 1 is in the shape of a hollow cylinder, and the edge on the outer peripheral surface side and the edge on the inner peripheral surface side of the end face in the central axis direction of the cylindrical shape are chamfered. Chamfered portion 41 is a portion formed by chamfering the edge on the outer peripheral surface side in the central axial direction, and chamfered portion 42 is a portion formed by chamfering the edge on the inner peripheral surface side in the central axial direction.

Bushing 1 has a two-layer structure including a back metal and a lining layer, from the outer peripheral surface to the inner peripheral surface. The back metal is a layer for reinforcing the mechanical strength of the lining layer. The back metal is formed of steel, for example. Note that the material of the back metal is not limited to steel, and may also be another metal such as iron, aluminum, or copper.

The lining layer is a layer for providing properties of a bearing, for example, properties such as friction properties, anti-seizure properties, anti-wear properties, conformability, foreign substance embedding properties (foreign substance robustness), and anti-corrosion properties. The lining layer is formed of a bearing alloy. In the lining layer, in order to prevent adhesion to a supporting shaft, the same material system as the shaft is avoided, and a material system different from the shaft is used. For example, if bushing 1 is used as a bearing for a shaft formed of steel, an aluminum alloy is used as the bearing alloy. Note that, in addition to an aluminum alloy, an alloy based on a metal other than aluminum, such as a copper sintered layer or a copper alloy may also be used.

An overlay layer may also be provided on the lining layer. The overlay layer is a layer that forms an inner peripheral surface that grips the shaft, and improves the properties of the lining layer, such as the coefficient of friction, conformability, anti-corrosion properties, and foreign substance embedding properties (foreign substance robustness). The overlay layer contains, for example, at least one of polyamide imide (PAI) resin, polyimide (PI) resin, epoxy resin, polyether ether ketone resin, phenol resin, polyamide, and elastomer.

The overlay layer also contains graphite as a solid lubricant, for example. The solid lubricant is added for improving friction properties. Graphite improves wettability, and improves initial conformability. The initial conformability is a property in which, when sliding contact is made with a mating material after sliding has started, the sliding area is worn and smoothed and the sliding properties improve. If the slidability is improved by the expression of the initial conformability, the amount of wear of the entire sliding layer is reduced. The solid lubricant is not limited to graphite. Any one or more of carbon, molybdenum disulfide, polytetrafluoroethylene (PTFE), boron nitride, tungsten disulfide, fluorocarbon resin, soft metals (e.g., Sn, Bi, etc.) may also be contained as the solid lubricant. For example, molybdenum disulfide provides good lubricity. Also, because PTFE has low intermolecular cohesion, it has the effect of reducing the friction coefficient. In addition, graphite improves wettability, and improves initial conformability. The initial conformability is a property in which, when sliding contact is made with a mating material after sliding has started, the sliding area is worn and smoothed and the sliding properties improve. If the slidability is improved by the expression of the initial conformability, the amount of wear of the entire sliding layer is reduced. In the present invention, one or more of an oxide (alumina, silica), a nitride (SiN), a carbide (SiC) and a sulfide (ZnS) may also be mixed with the solid lubricant.

Bushing 1 is formed by bending a plate material. FIG. 2 is a plan view of plate material 2 before the bending process is performed to form cylindrical bushing 1. Plate material 2 is formed into a shape shown in FIG. 2 by pressing a steel plate. Plate material 2 includes protruding portion 31A, protruding portion 31B, recessed portion 32A, and recessed portion 32B. Protruding portion 31A and protruding portion 31B are provided on one end face 33 that is a mating surface when the plate material is made cylindrical, and protrude from end face 33. Recessed portion 32A and recessed portion 32B are provided on the other end face 34 that is a mating surface when the plate material is made cylindrical, and are shaped to fit protruding portion 31A and protruding portion 31B. When plate material 2 is processed into a cylindrical shape, protruding portion 31A is fitted to recessed portion 32A, protruding portion 31B is fitted to recessed portion 32B, and the mating surfaces are abutted against each other.

Groove 20A, groove 20B, and branch grooves 21A to 21D are grooves formed through press processing. In bushing 1, lubricating oil is supplied to groove 20A, groove 20B, and branch grooves 21A to 21D. Groove 20A is a groove extending from the mating surface side where protruding portion 31A and protruding portion 31B are provided toward the mating surface side where recessed portion 32A and recessed portion 32B are provided. In groove 20A, the extension direction is a direction having a circumferential component. Groove 20A is an example of a first groove according to the present invention. Groove 20A is formed on the surface that is the inner peripheral surface in bushing 1 when plate material 2 is bent. Groove 20A is formed at the center of bushing 1 in the central axis direction. Groove 20A is a groove extending along the circumferential direction in the inner peripheral surface in bushing 1, but may be a groove forming a predetermined angle with the circumferential direction.

Branch groove 21A and branch groove 21B are grooves branched from groove 20A. The groove 20A, branch groove 21A and branch groove 21B are not formed in a groove-free zone Z. Branch groove 21A and branch groove 21B are examples of fourth grooves according to the present invention. In the present embodiment, when plate material 2 is viewed in the thickness direction, angle $\theta 1$ formed by branch groove 21A and branch groove 21B is 120°. Angle $\theta 1$ is not limited to 120°, and may be another angle. For example, angle $\theta 1$ may also be 180°. In each of branch groove 21A and branch groove 21B, the extension direction is a direction having a component in the axial direction within a predetermined range from groove 20A.

In branch groove 21A, the width in the range of predetermined distance L from the end to groove 20A side tapers off on the side opposite to the side of the branch from groove 20A. Also, in branch groove 21B, the width in the range of predetermined distance L from the end to groove 20A side tapers off on the side opposite to the side of the branch from groove 20A. That is, in each of branch groove 21A and branch groove 21B, the cross-sectional area of the groove gradually decreases toward the end on the side opposite to the side of the branch from groove 20A. In the present embodiment, distance L is 5 mm, but may also be a distance other than 5 mm. When viewed in the thickness direction of plate material 2, the edge of the portion where the width gradually decreases in each of branch groove 21A and branch groove 21B has a curved shape (R shape) that protrudes to the outside of the groove. Further, in the portion where the width of each of branch groove 21A and branch groove 21B gradually decreases, the edge on end face 33 side and the edge on end face 34 side intersect, and the angle formed by these two edges is an acute angle.

Groove 20B is a groove extending from end face 34 side to end face 33 side. In groove 20B, the extension direction is a direction having a component in the circumferential direction. Groove 20B is an example of a third groove according to the present invention. Groove 20B is formed on the surface that is the inner peripheral surface in bushing 1 when plate material 2 is bent. Groove 20B is formed at the center of bushing 1 in the central axis direction. Groove 20B is a groove extending along the circumferential direction in the inner peripheral surface in bushing 1, but may be a groove forming a predetermined angle with the circumferential direction.

Branch groove 21C and branch groove 21D are grooves branched from groove 20B. The groove 20B, branch groove 21C and branch groove 21D are not formed in the groove-free zone Z. Branch groove 21C and branch groove 21D are examples of the second grooves according to the present invention. In the present embodiment, when plate material 2 is viewed in the thickness direction, angle $\theta 2$ formed by branch groove 21C and branch groove 21D is 120°. Angle θ2 is not limited to 120°, and may be another angle. For example, angle θ2 may also be 180°. In each of branch groove 21C and branch groove 21D, the extension direction is a direction having a component in the axial direction within a predetermined range from groove 20B.

In branch groove 21C, the width in the range of predetermined distance L from the end to groove 20B side tapers off on the side opposite to the side of the branch from groove 20B. Also in branch groove 21D, the width in the range of predetermined distance L from the end to groove 20B side tapers off on the side opposite to the side of the branch from groove 20B. That is, in each of branch groove 21C and branch groove 21D, the cross-sectional area of the groove gradually decreases toward the end on the side opposite to the side of the branch from groove 20B. When viewed in the thickness direction of plate material 2, the edge of the portion where the width gradually decreases in each of branch groove 21C and branch groove 21D has a curved shape (R shape) that protrudes to the outside of the groove. Further, in the portion where the width of each of branch groove 21C and branch groove 21D gradually decreases, the edge on end face 33 side and the edge on end face 34 side intersect, and the angle formed by the two edges is an acute angle.

Figure 3:
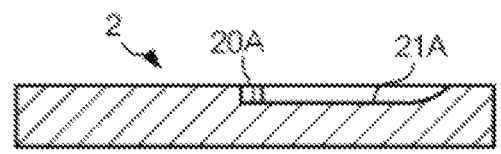
FIG. 3 is a cross-sectional view taken along line A-A in FIG. 2.

FIG. 3 is a cross-sectional view taken along line A-A in FIG. 2, that is, a cross-sectional view showing a state in which plate material 2 is cut at the center position in the width direction of branch groove 21A along the extension direction of branch groove 21A. In branch groove 21A, the depth in the range of predetermined distance L from the end to groove 20A side gradually decreases in a curved shape (R shape) on the side opposite to the side of the branch from groove 20A. In branch groove 21B, the depth in the range of predetermined distance L from the end to groove 20A side gradually decreases in a curved shape (R shape) on the side opposite to the side of the branch from groove 20A. Also in each of branch groove 21C and branch groove 21D, the depth in the range of predetermined distance L from the end to groove 20B side gradually decreases in a curved shape (R shape) on the side opposite to the side of the branch from groove 20B.

Figure 4:
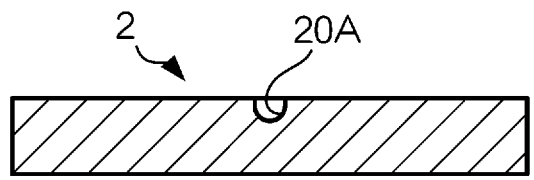
FIG. 4 is a cross-sectional view taken along line B-B in FIG. 2.

FIG. 4 is a cross-sectional view taken along line B-B in FIG. 2, that is, a cross-sectional view showing a state in which plate material 2 is cut at the position of groove 20A, along the width direction of groove 20A. The bottom of groove 20A is curved (semi-circular).

Note that, similar to groove 20A, the shape of the bottom of each of groove 20B and branch grooves 21A to 21D is also semi-circular.

When forming branch grooves 21A to 21D through press processing, the portion to be a groove in plate material 2 is displaced by a mold. Here, in each of branch grooves 21A to 21D, if the amount of displacement is large at the portion of the end opposite to the branching side, cracking occurs at the end portion. In the present embodiment, in each of branch grooves 21A to 21D, because the edges of the end on the opposite side of the branching side intersect each other to form an acute angle, and the displacement amount of plate material 2 is small, the occurrence of cracking can be suppressed.

MODIFICATIONS

Although the embodiment of the present invention has been described above, the present invention is not limited to the above-described embodiment, and can be realized in various other forms. For example, the above-described embodiment may be modified as follows to implement the present invention. The above-described embodiment and the following modifications may be combined with each other.

In the above-described embodiment, the width and the depth of each of branch grooves 21A to 21D gradually decrease within predetermined distance L from the end thereof. However, the width may gradually decrease and the depth may not gradually decrease, or the depth may gradually decrease and the width may not gradually decrease.

Figure 5:
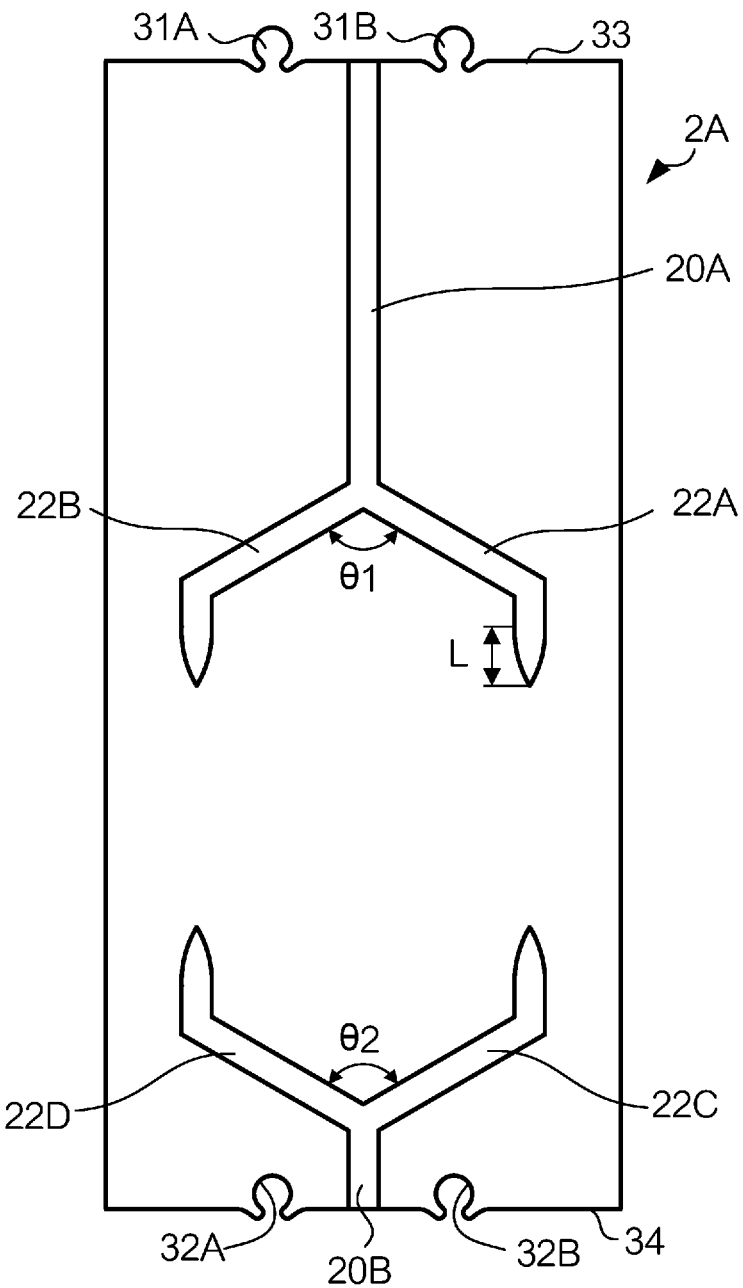
FIG. 5 is a plan view of plate material 2A.

In the above-described embodiment, branch grooves 21A to 21D are linear grooves when pressed, but the pressed shape of the grooves branched from groove 20A and groove 20B is not limited to a straight line. FIG. 5 is a plan view of plate material 2A provided with grooves according to a modification. Bushing 1 is formed by bending plate material 2A.

Branch groove 22A and branch groove 22B are grooves branched from groove 20A, and are examples of the second grooves according to the present invention. In each of branch groove 22A and branch groove 22B, the extension direction is a direction having a component in the axial direction within a predetermined range from groove 20A. Branch groove 22A is bent toward the mating surface side, on which recessed portion 32A and recessed portion 32B are located, at a predetermined distance from the side of the branch from groove 20A. Branch groove 22B is bent toward the mating surface side, on which recessed portion 32A and recessed portion 32B are located, at a predetermined distance from the side of the branch from groove 20A. The width of each of branch groove 22A and branch groove 22B tapers off within predetermined distance L from the end on the side opposite to the side of the branch from groove 20A, toward the bent portion. The tapered portions of branch groove 22A and branch groove 22B are grooves extending along the circumferential direction of the inner peripheral surface in bushing 1. In the part where the width gradually decreases in each of branch groove 22A and branch groove 22B, the two edges intersect, and the angle formed by the two edges is an acute angle.

Branch groove 22C and branch groove 22D are grooves branched from groove 20B, and are examples of the fourth grooves according to the present invention. In each of branch groove 22C and branch groove 22D, the extension direction is a direction having a component in the axial direction within a predetermined range from groove 20B. Branch groove 22C is bent toward the mating surface side, on which protruding portion 31A and protruding portion 31B are located, at a predetermined distance from the side of the branch from groove 20B. Branch groove 22D is bent toward the mating surface side, on which protruding portion 31A and protruding portion 31B are located, at a predetermined distance from the side of the branch from groove 20B. The width of each of branch groove 22C and branch groove 22D tapers off within predetermined distance L from the end on the side opposite to the side of the branch from groove 20B, toward the bent portion.

The tapered portions of branch groove 22C and branch groove 22D are grooves extending along the circumferential direction of the inner peripheral surface in bushing 1. Also, in the part where the width gradually decreases in each of branch groove 22C and branch groove 22D, the two edges intersect, and the angle formed by the two edges is an acute angle.

According to the present modification, the lubricating oil is supplied from the tapered ends of branch grooves 22A to 22D in the circumferential direction of bushing 1, and the occurrence of seizing can be suppressed.

Figure 6:
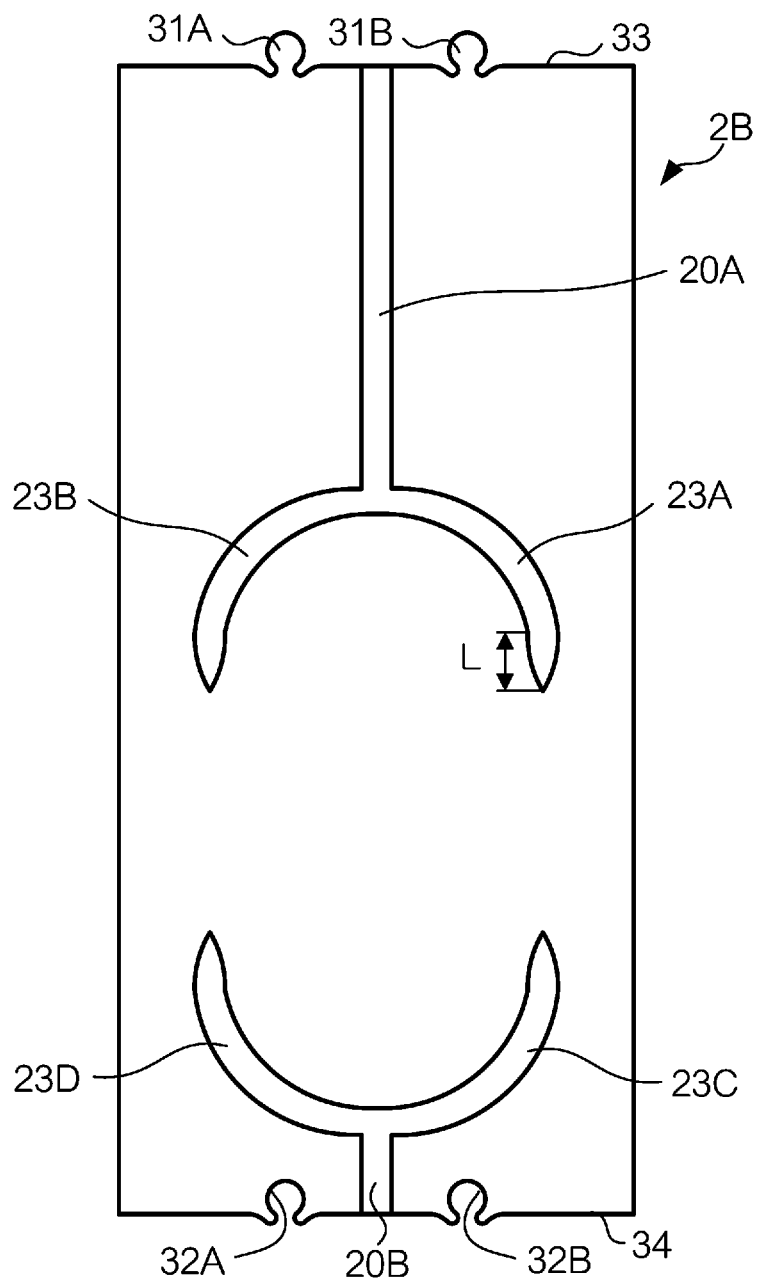
FIG. 6 is a plan view of plate material 2B.

In the above-described embodiment, branch grooves 21A to 21D are linear grooves when pressed, but the grooves branched from groove 20A and 20B may also be curved. FIG. 6 is a plan view of plate material 2B provided with grooves according to a modification. Bushing 1 is formed by bending plate material 2B.

Branch groove 23A and branch groove 23B are grooves branched from groove 20A, and are examples of the second grooves according to the present invention. In each of branch groove 23A and branch groove 23B, the extension direction is a direction having a component in the axial direction within a predetermined range from groove 20A. Branch groove 23A and branch groove 23B are arc-shaped grooves. The width of each of branch groove 23A and branch groove 23B tapers off within predetermined distance L from the end on the side opposite to the side of the branch from groove 20A. The tapered portions of branch groove 23A and branch groove 23B are grooves extending along the circumferential direction of the inner peripheral surface in bushing 1. In the part where the width gradually decreases in each of branch groove 23A and branch groove 23B, the two edges intersect, and the angle formed by the two edges is an acute angle.

Branch groove 23C and branch groove 23D are grooves branched from groove 20B, and are examples of the fourth grooves according to the present invention. In each of branch groove 23C and branch groove 23D, the extension direction is a direction having a component in the axial direction within a predetermined range from groove 20B. Branch groove 23C and branch groove 23D are arc-shaped grooves. The width of each of branch groove 23C and branch groove 23D tapers off within predetermined distance L from the end on the side opposite to the side of the branch from groove 20B. The tapered portions of branch groove 23C and branch groove 23D are grooves extending along the circumferential direction of the inner peripheral surface in bushing 1. In the part where the width gradually decreases in each of branch groove 23C and branch groove 23D, the two edges intersect, and the angle formed by the two edges is an acute angle.

Also in the present modification, the lubricating oil is supplied from the tapered ends of branch grooves 23A to 23D in the circumferential direction of bushing 1, and the occurrence of seizing can be suppressed.

Figure 7:
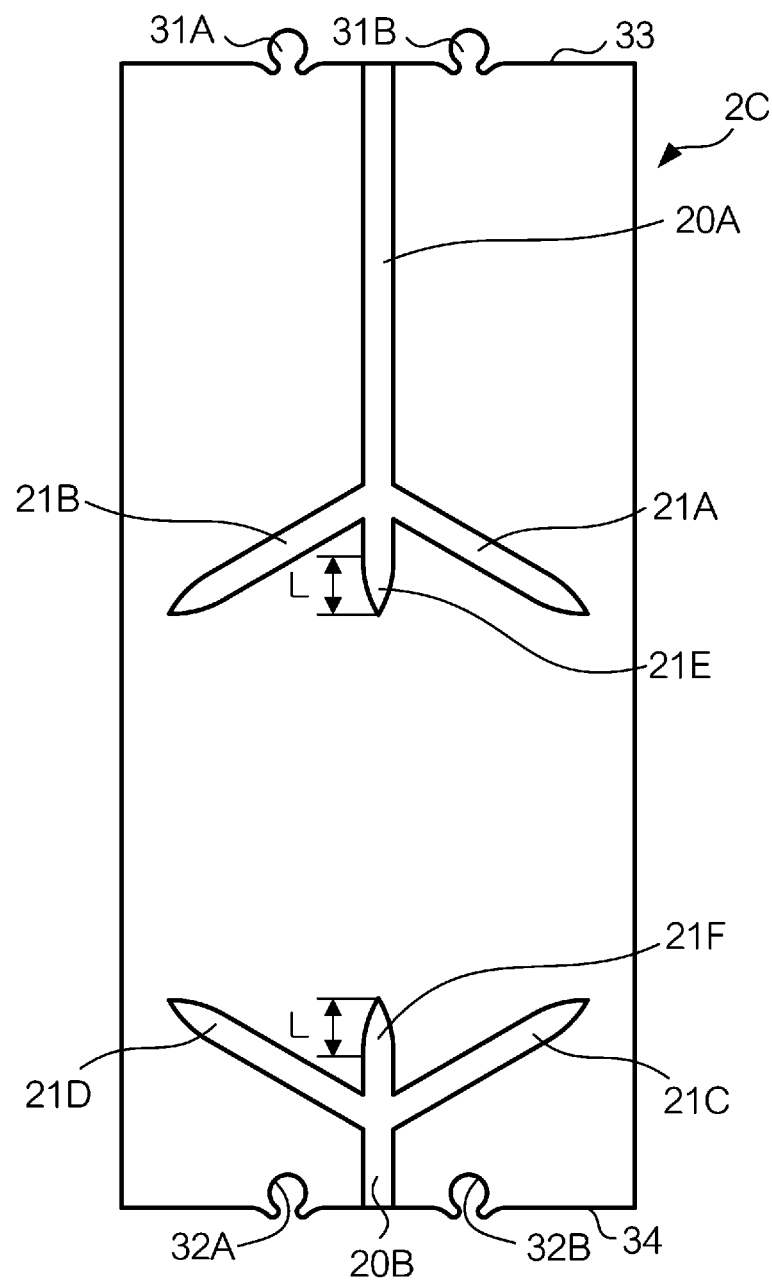
FIG. 7 is a plan view of plate material 2C.

In the embodiment described above, the number of grooves branched from groove 20A is two, and the number of grooves branched from groove 20B is two. However, the number of grooves respectively branched from groove 20A and groove 20B is not limited to two. FIG. 7 is a plan view of plate material 2C provided with grooves according to a modification. Bushing 1 is formed by bending plate material 2C.

Branch groove 21E is a groove branched from groove 20A, and is an example of a second groove according to the present invention. The angle formed by branch groove 21A and branch groove 21E is 60°, and the angle formed by branch groove 21B and branch groove 21E is also 60°. In branch groove 21E, the width in the range of predetermined distance L from the end to groove 20A side tapers off on the side opposite to the side of the branch from groove 20A. In the part where the width gradually decreases in branch groove 21E, the two edges intersect, and the angle formed by the two edges is an acute angle. Also, in branch groove 21E, the depth in the range of predetermined distance L from the end to groove 20A side gradually decreases on the side opposite to the side of the branch from groove 20A, and becomes shallower toward the side opposite to groove 20A.

Branch groove 21F is a groove branched from groove 20B, and is an example of a fourth groove according to the present invention. The angle formed by branch groove 21C and branch groove 21F is 60°, and the angle formed by branch groove 21D and branch groove 21E is also 60°. In branch groove 21F, the width in the range of a predetermined distance L from the end to groove 20B side tapers off on the side opposite to the side of the branch from groove 20B. In the part where the width gradually decreases in branch groove 21F, the two edges intersect, and the angle formed by the two edges is an acute angle. In branch groove 21F, the depth in the range of predetermined distance L from the end to groove 20B side gradually decreases on the side opposite to the side of the branch from groove 20B, and becomes shallower toward the side opposite to groove 20B.

In the present modification, the lubricating oil is supplied from the tapered ends of grooves 21A to 21F in the circumferential direction of bushing 1, and the occurrence of seizing can be suppressed.

Figure 8:
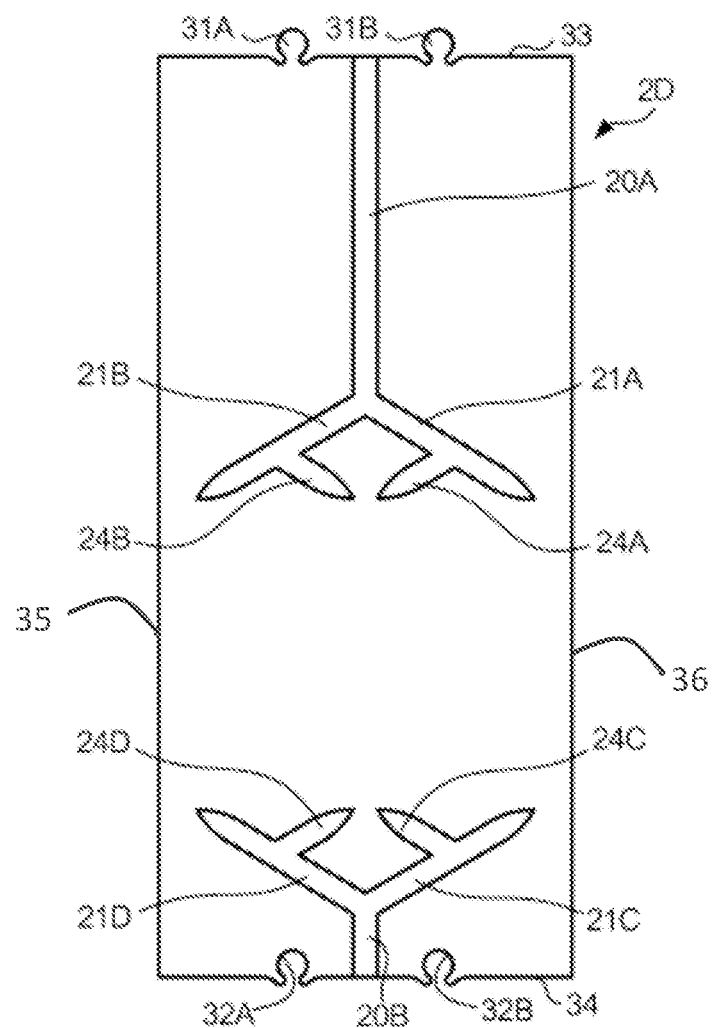
FIG. 8 is a plan view of plate material 2D.

In the present invention, the groove branched from groove 20A and the groove branched from groove 20B may also be further branched. FIG. 8 is a plan view of plate material 2D provided with grooves according to a modification. Bushing 1 is formed by bending plate material 2D.

Branch groove 24A is a groove branched from branch groove 21A. In branch groove 24A, the extension direction is a direction having a component in the axial direction within a predetermined range from groove 21A. In branch groove 24A, on the side opposite to the side of the branch from branch groove 21A, the width within a predetermined range of distance L from the end to branch groove 21A side is tapered off, and the depth gradually becomes shallower toward the end. Branch groove 24B is a groove branched from branch groove 21B. In branch groove 24B, the extension direction is a direction having a component in the axial direction within a predetermined range from groove 21B. In branch groove 24B, on the side opposite to the side of the branch from branch groove 21B, the width within a predetermined range of distance L from the end to branch groove 21B side is tapered off, and the depth gradually becomes shallower toward the end. Branch groove 24C is a groove branched from branch groove 21C. In branch groove 24C, the extension direction is a direction having a component in the axial direction within a predetermined range from groove 21C. In branch groove 24C, on the side opposite to the side of the branch from branch groove 21C, the width within a predetermined range of distance L from the end to branch groove 21C side is gradually tapered, and the depth gradually becomes shallower toward the end. Branch groove 24D is a groove branched from branch groove 21D. In branch groove 24D, the extension direction is a direction having a component in the axial direction within a predetermined range from groove 21D. In branch groove 24D, on the side opposite to the side of the branch from branch groove 21D, the width within a predetermined range of distance L from the end to branch groove 21D side is gradually tapered, and the depth becomes shallow gradually toward the end. Also, in the part where the width gradually decreases in each of branch grooves 24A to 24D, the two edges intersect, and the angle formed by the two edges is an acute angle. The grooves 21A and 21B respectively extend closer to the first circumferential edge 35 and the second circumferential edge 36 than the branch grooves 24A and 24B. As such, the grooves 21A and 21B are the two axially outermost extending grooves of the grooves 21A, 21B, 24A and 24B. Similarly, the grooves 21C and 21D respectively extend closer to the first circumferential edge 35 and the second circumferential edge 36 than the branch grooves 24C and 24D. As such, the grooves 21C and 21D are the two axially outermost extending grooves of the grooves 21C, 21D, 24C and 24D.

In the present modification, the lubricating oil is supplied from the tapered ends of branch grooves 21A to 21D and the tapered ends of branch grooves 24A to 24D in the circumferential direction of bushing 1, and the occurrence of seizing can be suppressed.

In the above-described embodiments, each of the grooves provided in bushing 1 has a curved surface at the bottom, but may also have a flat surface. In a configuration in which the bottom of the groove is flat, the groove may also have a configuration in which a wall and the bottom of the groove intersect at a right angle (recessed shape), or the opening may also be wider than the width of the bottom. Also, each of the grooves provided in bushing 1 may also have an acute angle (V shape) or obtuse angle at the bottom. In the configuration where the shape of the bottom is an acute angle, each of the grooves provided in bushing 1 may also have a configuration in which the acute angle narrows the further the distance from the branched portion.

In the present invention, the widths of the grooves branched from groove 20A may be different from the width of groove 20A, and the widths of the grooves branched from groove 20B may also be different from the width of groove 20B. For example, the widths of branch groove 21A and branch groove 21B may also be narrower than the width of groove 20A, and the widths of branch groove 21C and branch groove 21D may also be narrower than the width of groove 20B. Also, in the present invention, the depth of groove 20A may also be different from the depths of the grooves branched from groove 20A, and the depth of groove 20B may also be different from the depths of the grooves branched from groove 20B. For example, the depths of branch groove 21A and branch groove 21B may also be shallower than the depth of groove 20A, and the depths of branch groove 21C and branch groove 21D may also be shallower than the depth of groove 20B.

In the present invention, if the width of the opening is wider than the width of the bottom of the groove, each of the grooves branched from groove 20A and the grooves branched from groove 20B may be configured such that the angle between a wall of the groove and the surface on which the groove is formed is an obtuse angle. Also, in this configuration, for example, in each of branch groove 21A and branch groove 21B, the angle between the surface on which the groove is formed and the wall on end face 34 side may also be larger than the angle between the surface on which the groove is formed and the wall on end face 33 side.

In the embodiments described above, the case where the branched grooves are provided on the bushing supporting the piston pin has been described, but the embodiments or the modifications described above may also be applied to a half bearing.

Figure 9A:
FIGS. 9A-9D are views showing a modification of an end of a branch groove.
Figure 9B:
Figure 9C:
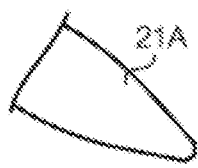
Figure 9D:

In the present invention, the shape of the end of the branch groove is not limited to the shape described in the above embodiments. FIGS. 9A-9D are views showing a modification of shape of the end of the branch groove. As shown in FIG. 9A, the wall surface at the end of the branch groove may also extend along the width direction of the branch groove. Also, as shown in FIG. 9B, the end of the branch groove may also have an R-shape, and as shown in FIG. 9C, the end of the branch groove may also have an obtuse angle. Also, as shown in FIG. 9D, of the wall surface within a predetermined range from the branch groove, angle θ3 between the wall surface (the first wall surface) close to the end face in the axial direction and the central axis direction may also be larger than angle θ4 between the wall surface (the second wall surface) far from the end face in the axial direction and the central axis direction. With the configuration shown in FIG. 9D, the lubricating oil that has flowed to the end of the branch groove along the branch groove can easily flow in the circumferential direction.

Figure 10A:
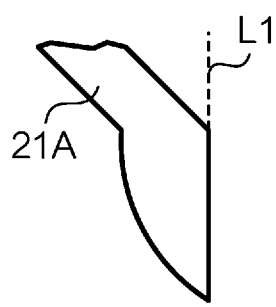
FIGS. 10A-10C are views showing a modification of an end of a branch groove.
Figure 10B:
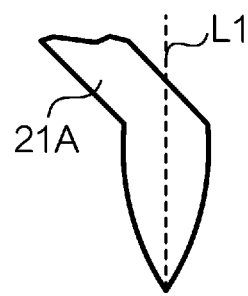
Figure 10C:
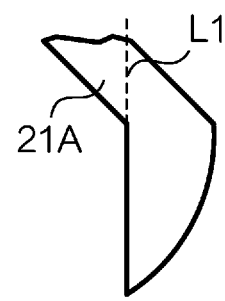

In the present invention, as shown in FIGS. 10A-10C, with respect to the end of the branch groove, when imaginary line L1 is drawn in the circumferential direction from the end of the end, imaginary line L1 may configured to be contained in the region of the groove within a predetermined range from the end of the groove. With this configuration, as compared with the configuration shown in FIG. 2 in which imaginary line L1 is outside the region of the groove, the lubricating oil that has flowed to the end of the branch groove is more likely to flow in the circumferential direction.

The invention claimed is:

1. A slide bearing formed in a cylindrical shape and having an inner peripheral surface sliding along an axis, the slide bearing comprising:
 a first groove extending in a direction having a component in a circumferential direction, on the inner peripheral surface;
 at least two second grooves branched from the first groove, extending in directions each having a component in an axial direction at least within a predetermined range from the first groove;
 a third groove extending in a direction having a component in a circumferential direction, on the inner peripheral surface; and
 at least two fourth grooves branched from the third groove, extending in directions each having a component in the axial direction at least within a predetermined range from the third groove,
 wherein:
 within a predetermined range from an end of each second groove opposite to the first groove, a width or a depth decreases toward the end;
 the inner peripheral surface has a groove-free zone extending continuously from a first circumferential edge of the slide bearing to a second circumferential edge of the slide bearing, in which an entirety of the first groove and the at least two second grooves are not formed;
 within a predetermined range from an end of each fourth groove opposite to the third groove, a width or a depth decreases toward the end;
 an entirety of the third groove and the at least two fourth grooves are not formed in the groove-free zone;
 a pair of the second grooves are formed symmetrically relative to the first groove, the pair of the second grooves being formed on a first circumferential side of the groove-free zone; and
 a pair of the fourth grooves are formed symmetrically relative to the third groove, the pair of the fourth grooves being formed on a second circumferential side of the groove-free zone and opposing the pair of second grooves symmetrically with respect to the groove-free zone, the first and second circumferential sides being opposite to each other.

2. The slide bearing according to claim 1,
 wherein the at least two second grooves include two axially outermost extending grooves that extend respectively closer to the first and second circumferential edges in the axial direction than any other of the at least two second grooves,
each of the axially outermost extending grooves has first and second walls, and
within the predetermined range from the end, an angle between an extension direction of the first wall and the axial direction is larger than an angle between an extension direction of the second wall and the axial direction, the first wall being located closer to an adjacent most one of the first and second circumferential edges than the second wall.

3. The slide bearing according to claim 1,
wherein, within the predetermined range from the end of each second groove, an imaginary line drawn from the end in the circumferential direction borders or crosses the predetermined range where the second groove decreases in width or depth.

\* \* \* \* \*